United States Patent [19]

Nishino et al.

[11] Patent Number: 4,927,598
[45] Date of Patent: May 22, 1990

[54] RADIOACTIVITY REDUCTION METHOD OF A NUCLEAR POWER PLANT AND A NUCLEAR POWER PLANT REDUCED IN RADIOACTIVITY

[75] Inventors: Yoshitaka Nishino; Toshio Sawa; Katsumi Ohsumi; Hisao Itow, all of Hitachi, Japan

[73] Assignee: Hitachi, Ltd., Tokyo, Japan

[21] Appl. No.: 240,601

[22] Filed: Sep. 6, 1988

[30] Foreign Application Priority Data

Sep. 9, 1987 [JP] Japan .................. 62-223949

[51] Int. Cl.$^5$ .............................................. G21D 3/08
[52] U.S. Cl. .................................................. 376/306
[58] Field of Search .............. 376/306, 310, 308, 305

[56] References Cited

U.S. PATENT DOCUMENTS

| | | | |
|---|---|---|---|
| 3,361,636 | 1/1968 | Bagge | 376/209 |
| 3,663,725 | 5/1972 | Pearl | 376/306 |
| 3,960,655 | 6/1976 | Bohanan et al. | 376/435 |
| 3,976,541 | 8/1976 | Stiteler et al. | 376/306 |
| 4,042,455 | 8/1977 | Brown | 376/306 |
| 4,722,823 | 2/1988 | Honda et al. | 376/306 |
| 4,764,338 | 8/1988 | Uchida et al. | 376/313 |

FOREIGN PATENT DOCUMENTS

| | | |
|---|---|---|
| 60-188893 | 9/1985 | Japan . |
| 61-79194 | 4/1986 | Japan . |
| 61-186897 | 8/1986 | Japan . |
| 61-205897 | 9/1986 | Japan . |
| 61-213693 | 9/1986 | Japan . |
| 61-240196 | 10/1986 | Japan . |
| 61-245093 | 10/1986 | Japan . |
| 62-85897 | 4/1987 | Japan .................. 376/306 |

Primary Examiner—Daniel Wasil
Attorney, Agent, or Firm—Antonelli, Terry & Wands

[57] ABSTRACT

The primary cooling water in a primary cooling water recirculation path of a nuclear power plant is heated and recirculated in the presence of beryllium, and a film of nickel ferrite and/or cobalt ferrite is formed on the surface of pipings and various apparatus and devices connecting with the primary cooling water. The beryllium is injected in the form of beryllium ion into the primary cooling water, or is disposed in the form of beryllium or beryllium-containing alloy in the piping and/or the various apparatus and devices.

7 Claims, 4 Drawing Sheets

RADIOACTIVITY REDUCTION METHOD OF A NUCLEAR POWER PLANT AND A NUCLEAR POWER PLANT REDUCED IN RADIOACTIVITY

BACKGROUND OF THE INVENTION

The present invention relates to a nuclear power plant and a method of reducing the radioactivity in the power plant and, more particularly, to a nuclear power plant in which iron crud in the primary cooling water are fixed and which is reduced in the radioactivity.

In nuclear power plants, the quality control of a primary cooling water is effected to reduce radiation dose which the workers working there receive. Corrosion products (iron crud), which are produced from pipings of a primary cooling water line and comprise iron oxides and iron hydroxides as main components, flow into a reactor together with nickel and cobalt which are convertible to radionuclides $Co^{58}$ and $Co^{60}$ by radiation, respectively. In the reactor, the iron crud, nickel and cobalt are adhered to the surfaces of fuel claddings and exposed to neutron radiation there. As a result, the nickel and the cobalt are converted into $Co^{58}$ and $Co^{60}$, respectively. The radioactivated nuclides such as $Co58$, $Co^{60}$, etc. dissolve from the cladding surfaces into the reactor water, and adhere to, precipitate in pipings in the reactor, whereby radiation dose in a reactor water recirculation line, a condensed water line, a feed water line, etc. increases, which causes an increase in radiation exposure to the workers. The radiation dose is considered possible to be suppressed by reduce an amount of the iron crud. Therefore, various measures for reducing the iron crud have been taken, for example, they are an improvement on the condensed water purification system line, oxygen injection into the feed water line, use of anticorrosive material, etc.

However, when iron crud concentration in the feed water becomes very low, a balance between the iron crud and nickel, cobalt adhering to the fuel rod cladding surfaces, is broken, and an amount of nickel, cobalt relative to the iron becomes large. Therefore, dissolution speed of $Co^{58}$, $Co^{60}$ from the fuel rod cladding surface increases and radioactivity in the reactor water is raised, so that the radiation dose in the reactor pipings is raised. In order to reduce the radiation dose, it is necessary to reduce the dissolution speed of $Co^{58}$, $Co^{60}$ from the fuel rod cladding surface. Therefore, it is necessary to convert the nickel, cobalt into nickel ferrite, cobalt ferrite which are compound oxides of nickel, cobalt and iron and low in dissolution speed.

In order to form the nickel ferrite or cobalt ferrite, stoichiometrically, iron of 2 mols of is needed to 1 mol of nickel, cobalt of 1 mol, however, a conversion rate to the ferrite does not become 100%, so that the iron is needed more than the stoichiometric amount. As mentioned above, in order to reduce radiation dose of $Co^{58}$, $Co^{60}$ from the piping surfaces, it is effective to convert $Co^{58}$, $Co^{60}$ to nickel ferrite, cobalt ferrite. In a BWR power plant, control of iron concentration to nickel and cobalt (in particular to the nickel which is more than the cobalt) has been effected. As a method of controlling the iron concentration, there is a method of controlling an amount of iron crud flowing in the reactor by causing part of condensed water to by-pass a condensed water filter which is one of two kinds of condensed water purification apparatus. Further, there is a method of injecting iron hydroxides, iron oxides and iron ions into a cooling water in pipings between a downstream side of a condensed water purification apparatus and the reactor, as described in Japanese Patent Laid-Open Nos. 61-240196, 61-245093.

In the above-mentioned prior arts, a conversion rate of nickel and/or cobalt into nickel ferrite and/or cobalt ferrite through reaction between the nickel and/or cobalt and iron component such as in iron oxide, iron hydroxide, iron ion is low and a large amount of the iron crud is produced, so that the radioactivity can not be reduced sufficiently.

SUMMARY OF THE INVENTION

An object of the invention is to provide a method of reducing radioactivity of pipings in a primary cooling water recirculation line and various apparatus and devices in the power plant by converting nickel and/or cobalt into nickel ferrite and/or cobalt ferrite through an effective reaction between iron crud, particularly, $-Fe_2O_3$ and nickel and/or cobalt, and a nuclear power plant reduced in radioactivity of pipings in a primary cooling water recirculation line and various apparatus and devices thereof.

Another object of the invention is to provide a method of reducing radioactivity in a primary cooling water recirculation line and various apparatus and devices in a power plant by converting nickel and/or cobalt in the primary cooling water and reactor water into nickel ferrite and/or cobalt ferrite with a stoichiometric amount of iron crud.

The present invention resides in that a primary cooling water in a primary cooling water line in a nuclear power plant is heated and recirculated in existance of a substance which is able to promote a reaction, between iron crud and nickel and/or cobalt, for converting them into nickel ferrite and/or cobalt ferrite, and the iron crud and nickel and/or cobalt are converted to nickel ferrite and/or cobalt ferrite at a high conversion rate, whereby the radioactivity in the power plant is reduced.

According to an aspect of the present invention, the substance which is able to promote a reaction between the iron crud and nickel and/or cobalt to convert the iron crud, nickel and/or cobalt into Ni-ferrite and/or Co-ferrite is beryllium, for example. Preferably, the reaction is carried out in existance of beryllium.

A method of bringing Be into the primary cooling water line includes such a method of directly injection Be ion into the primary cooling water from outside the primary cooling water line, and a method of making structural member of the cooling water recirculation line of Be-containing alloy or disposing Be or Be-alloy in the recirculation line, and bringing the cooling water into contact with the Be or Be-alloy thereby to cause the cooling water to contain the Be or Be-alloy. In particular, the Be injection method is easy in control of the Be injection amount, able to feed the Be according to the operational condition of the reactor, and able to promote the production of nickel ferrite and/or cobalt ferrite while monitoring continuously or successively an amount of iron crud or other substances.

The heating and recirculation are preferable to be conducted under the same condition as operational conditions of the reactor. Therefore, the dissolved oxygen, pH, heating temperature, etc. are preferable to be the same as ones of the reactor water. The heating and recirculation can be effected by recirculating a primary cooling water at a predetermined speed by a pump, etc.

provided in the cooling water recirculation system or line, whereby the primary cooling water can be heated to a predetermined temperature.

It is preferable to contain nickel ferrite and cobalt ferrite of 95% or more in films formed in the pipings or various apparatus and devices. By forming the film comprising 95% or more of nickel ferrite and cobalt ferrite, dissolution of radionclides from the fuel rod cladding in the reactor or nickel or cobalt ferrite from the pipings of the feed water reciculation line etc. in other than the reactor is reduced and the radioactivity can be reduced.

Further, by effecting the above-mentioned heating and recirculation before heating by nuclear reaction, the radioactivity in the power plant is reduced more.

Still further, at a time of periodic inspection of the nuclear power plant, by recirculating a primary cooling water in order of a feed water heater, a condenser, a filter, a demineralizer and the feed water heater, through a feed water recirculation line in which the primary cooling water from the heater is returned to the condenser, and heating and recirculating the primary cooling water in existance of beryllium, the radioactivity in the feed water recirculation line other than the reactor can be reduced.

DETAILED DESCRIPTION OF THE INVENTION

Figure 1:
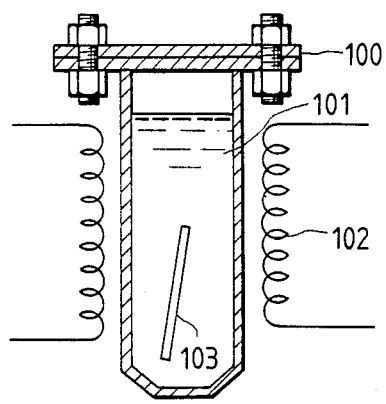
FIG. 1 is a sectional view of an experimental apparatus used in an experiment of reaction for producing nickel ferrite.

As mentioned above, an aspect of the present invention resides in a method of reducing radioactivity in a nuclear power plant, characterized by heating and recirculating a primary cooling water in a primary cooling water recirculation line in existance of beryllium, and forming a film comprising nickel ferrite and/or cobalt ferrite as main components on the surfaces of pipings and apparatus and devices of the primary cooling water recirculation line.

The above-mentioned beryllium has a catalytic effect on a reaction between the iron crud and the nickel and/or cobalt to produce nickel ferrite and/or cobalt ferrite. The reactions between iron compounds forming the iron crud and nickel and/or cobalt in existance of Be are given as in the table 1.

TABLE 1

| Iron crud components | Reaction equation | | |
|---|---|---|---|
| $Fe(OH)_3$ | $2Fe(OH)_3 + NiO$ | Be $\rightarrow$ | $NiFe_2O_4 + 3H_2O$ |
| | $2Fe(OH)_3 + CoO$ | Be $\rightarrow$ | $CoFe_2O_4 + 3H_2O$ |
| FeOOH | $2FeOOH + NiO$ | Be $\rightarrow$ | $NiFe_2O_4 + H_2O$ |
| | $2FeOOH + CoO$ | Be $\rightarrow$ | $CoFe_2O_4 + H_2O$ |
| $\gamma$-FeOOH | $2\gamma$-FeOOH + NiO | Be $\rightarrow$ | $NiFe_2O_4 + H_2O$ |
| | $2\gamma$-FeOOH + CoO | Be $\rightarrow$ | $CoFe_2O_4 + H_2O$ |
| $\alpha$-FeOOH | $2\alpha$-FeOOH + NiO | Be $\rightarrow$ | $NiFe_2O_4 + H_2O$ |
| | $2\alpha$-FeOOH + CoO | Be $\rightarrow$ | $CoFe_2O_4 + H_2O$ |
| $\alpha$-$Fe_2O_3$ | $\alpha$-$Fe_2O_3$ + NiO | Be $\rightarrow$ | $NiFe_2O_4$ |
| | $\alpha$-$Fe_2O_3$ + CoO | Be $\rightarrow$ | $CoFe_2O_4$ |

In particular, the catalytic effect is remarkable for a reaction between hematite ($\alpha$-$Fe_2O_3$) and nickel. The $\alpha$-$Fe_2O_3$ and nickel do not react under the conditions of the reactor water and are not converted into nickel ferrite. However, the $\alpha$-$Fe_2O_3$ and nickel react and are converted into nickel ferrite under the conditions of reactor water including beryllium. Further, in case of a reaction between nickel and $\alpha$-FeOOH, which do not produce nickel ferrite under the conditions of reactor water without beryllium as in the case of the $\alpha$-$Fe_2O_3$, the beryllium has the catalytic effect and causes the nickel and $\alpha$-FeOOH to convert into the nickel ferrite in a short time. The beryllium also has the calalytic effect on each component of the iron crud such as Fe(OH)$_3$, FeOOH, $\gamma$-FeOOH, causes the reaction between the each component of the iron crud and nickel and/or cobalt to raise its reaction speed, and raises greatly a conversion rate to nickel and/or cobalt ferrite.

The catalytic effect of the beryllium brings about by the following;

(1) by causing the beryllium to contain in a primary cooling water as beryllium ion or beryllium compound solution.

(2) by contacting the iron crud and nickel and/or cobalt with beryllium element, beryllium compound, or beryllium alloy in the reaction between the iron crud and nickel and/or cobalt.

By the catalytic function of beryllium, the rate of conversion of the iron crud and nickel and/or cobalt into nickel ferrite and/or cobalt ferrite reaches to about 100% and the reaction speed in the conversion becomes large when the reaction is effected in existance of beryllium.

The reaction for the conversion into the nickel ferrite and/or cobalt ferrite can be effected by a minimum amount of the iron crud, that is, by an amount of twice as much as stoichiometric amount of Ni and/or Co in Ni ferrite and/or Co ferrite.

As mentioned above, the iron crud and nickel and/or cobalt are converted into nickel ferrite and/or cobalt ferrite, and even if the nickel ferrite and/or cobalt ferrite is adhered to a fuel rod cladding surface and radioativated here, since dissolution speed is low, radioactivity in the reactor water can be maintained at a low level and the radiation dose of the surface of the cooling water recirculation line can be suppressed.

Further a stoichiometric amount of iron is sufficient to produce nickel ferrite and/or cobalt ferrite, so that an amount of precipitation of the iron crud on the reactor bottom can be reduced and an amount of iron crud which include radioactive neuclide and can be precipitated can be reduced.

A film of more amount of nickel ferrite and cobalt ferrite can be formed by injecting iron ion in existance of beryllium so that the radioactivity can be reduced more.

According to another aspect of the present invention, metal or metal ion which has a catalytic function and in existance of which 95% or more of iron cruds, nickel oxides and cobalt oxides can be converted into nickel ferrite and cobalt ferrite can be used instead of beryllium.

A nuclear power plant according to the present invention is characterized in that amounts of nickel ferrite and cobalt ferrite contained in a film formed on each surface of pipings and/or various apparatus and devices which are in contact with a primary cooling water are 95% or more. Such a film supresses dissolution of cruds into reactor water, thereby reducing the radioactivity.

According to the present invention, by injecting beryllium ion from an injector into a primary cooling water in a primary cooling water recirculation line and heating by nuclear reaction or before the nuclear reaction and recirculating the primary cooling water, a film comprising nickel ferrite and cobalt ferrite as main components can be formed on each surface of pipings and various apparatus and devices contacting with the primary cooling water.

Instead of injecting the beryllium ion from the injector, by arranging beryllium, beryllium-containing alloy in the pipings and/or the various apparatus and devices, such a film can be formed, whereby the radioactivity can be reduced.

Instead of beryllium ion, beryllium and beryllium-containing alloy, the above-mentioned metal or metal ion which has a catalytic function can be used in a similar manner to the above. As the metal, Mg, Ca, Sr or Ba can be taken.

EXAMPLE 1

The following experiments were conducted to clear influence of beryllium on a reaction of production of nickel ferrite from iron crud and nickel.

In the experiments, an experimental apparatus as shown in FIG. 1 was used. A sample water 101 containing iron crud and nickel and a contact material 103 were sealingly enclosed in an autoclave 100 which has a capacity of 100 cm$^3$ and heated by a heater 102. In the experiments, nickel hydroxide, the average particle diameter of which is 0.7 μm, and each of various kinds of iron oxides, the average particle diameter of which is 1 μm, were mixed so that a molar ratio of Ni to Fe is ½ and the mixture is 50 mg per one liter of pure water. The each iron compound and the nickel hydroxide were reacted for three hours under the conditions which are similar to ones of reactor water, that is, a temperature 288° C., dissolved oxygen concentration 100 ppb and pH 7.

TABLE 2

| Iron compounds | Nickel ferrite conversion rate (%) | Produced compounds other than nickel ferrite |
| --- | --- | --- |
| Fe(OH)$_3$ | 53 | α-Fe$_2$O$_3$ |

TABLE 2-continued

| Iron compounds | Nickel ferrite conversion rate (%) | Produced compounds other than nickel ferrite |
| --- | --- | --- |
| FeOOH | 36 | NiO, Ni(OH)$_2$ α-Fe$_2$O$_3$ |
| γ-FeOOH | 44 | NiO, Ni(OH)$_2$ α-Fe$_2$O$_3$ |
| α-FeOOH | 0 | NiO, Ni(OH)$_2$ α-Fe$_2$O$_3$ |
| α-Fe$_2$O$_3$ | 0 | NiO, Ni(OH)$_2$ α-Fe$_2$O$_3$ |
| Fe$_3$O$_4$ | 0 | Fe$_3$O$_4$, NiO, Ni (OH)$_2$ |

As is apparent from the table 2, the nickel ferrite conversion rate from iron crud to nickel ferrite is, at the most, 53% which is low. Even if the iron hydroxide, which is large in the nickel ferrite conversion rate, is injected into a reactor water, the iron component is needed more than a stoichimetric ratio of the iron component to nickel because iron compound other than the nickel ferrite is produced from the injected iron hydroxide.

Figure 2:
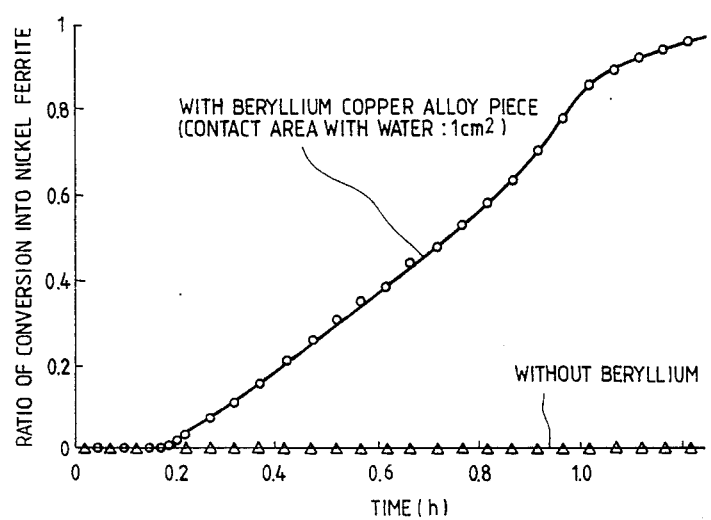
FIG. 2 is a graphical illustration showing relationship between nickel ferrite conversion rate and time.

Fe(OH)$_3$, FeOOH, γ-FeOOH, which are convertible to nickel ferrite, or α-FeOOH, as iron hydroxide is converted to α-Fe$_2$O$_3$ which is stable in a hot water of the same condition as reactor water. α-Fe$_2$O$_3$ is not converted into nickel ferrite as shown in FIG. 2. Therefore, if the iron hydroxide does not react with nickel before conversion to α-Fe$_2$O$_3$, the iron hydroxide is not converted into nickel ferrite. Althrough in a nuclear reactor plant, nickel, almost all of which is used in feed water heaters and structural members in the interior of the reactor, dissolves in the hot water, a part of the hydroxide iron is converted into α-Fe$_2$O$_3$, as a result, a rate of convesion of the iron hydroxide into nickel ferrite becomes low and the iron hydroxide is needed more than the stoichiometric ratio of iron component to nickel.

It is not desirable for maintaining the reactor to bring an excess amount of iron into the reactor because precipitate of iron crud increase in a reactor bottom. Further, the increase of iron crud probably causes an increase in precipitation of radioactive substances into the reactor bottom and recirculation pipings.

Table 3 shows results of experiments in which nickel ferrite reactions were caused using various catalysts.

As a sample, hematite (α-Fe$_2$O$_3$) powder, the average particle diameter of which is 1 μm, and nickel hydroxide (Ni(OH)$_2$) powder were mixed so as to be same mole and the mixture of 20 mg is dispersed in a pure water of 100 cm$^3$.

As a reaction conditions, simulated reactor water of temperature 285° C., pH 7, dissolved oxygen concentration 100 ppb was taken, and the reaction time was for 3 hours.

As a contact material for a catalytic effect, SUS 304 stainless steel, pure copper, zircalloy and beryllium copper each were used, and formed so that for each of the contact material, a contact area with the sample water is 25 cm$^2$. The beryllium copper alloy used here consists of 2% beryllium, 97.6% copper, 0.2% iron and 0.2% nickel, and the zircalloy consists of 98.28% zirconium, 1.5% tin, 0.1% iron, 0.08% chromium and 0.04% nickel.

It is noted from the table 3 that nickel ferrite is produced only when the beryllium copper alloy is used as the contact material, and the nickel ferrite conversion rate is 95% and very high.

Table 4 shows results of a study of the influence of beryllium and magnesium on a nickel ferrite production.

In the experiment, beryllium hydroxide powder 0.2 mg oxide beryllium powder 0.2 mg, beryllium ions and magnesium ions, the latter two of which are to be 1 ppb concentration thereof, are added in the hot water in stead of the above-mentioned contact material, and the experiments were conducted in a similar manner to the above. It is noted from the table 4 that as for the beryllium contact materials, the compound powder, the ions and the alloy each have substantially the same effect, and cause to produce nickel ferrite at a high conversion rate.

TABLE 3

| contact material | nickel ferrite conversion rate (%) |
|---|---|
| SUS 304 stainless steel | 0 |
| zircaloy | 0 |
| copper | 0 |
| beryllium copper alloy | 95 |

TABLE 4

| contact material | nickel ferrite conversion rate (%) |
|---|---|
| beryllium copper alloy | 95 |
| beryllium hydroxide | 96 |
| beryllium oxide | 95 |
| beryllium ion | 97 |
| magnesium ion | about 70 |

FIG. 2 shows results of a study of reaction speed in case of $\alpha$-$Fe_2O_3$ and $Ni(OH)$ are reacted in existance of beryllium.

A sample was used wherein 5 mg of a mixture formed by mixing $\alpha$-$Fe_2O_3$ powder, the average particle diameter of which is 1 $\mu$m, and $Ni(OH)_2$ powder, the average particle diameter of which is 0.7 $\mu$m so as to be same mole is added into a pure water of 1 cc and reacted under the conditions of temperature of 230° C., pH of 7 and dissolved oxygen concentration of 100 ppb. By tracing change in magnetization, change in the nickel ferrite conversion rate as the time proceeds is obtained. It is noted from FIG. 2 that the reaction does not occur without beryllium while the $\alpha$-$Fe_2O_3$ reacts with $Ni(OH)_2$ at a high speed in case of beryllium copper alloy piece (1.8 wt. % Be) is used wherein a contact area with water is 1 $cm^2$.

EXAMPLE 2

Figure 3:
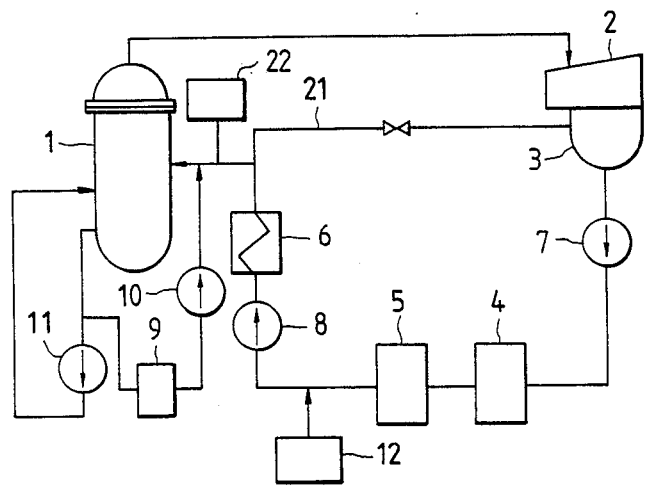
FIG. 3 is a schematic diagram showing a primary cooling water line in a BWR power plant of an embodiment of the present invention.

In FIG. 3 showing a primary cooling water recirculation system in a BWR power plant, steam generted in a BWR reactor is condensed to be condensed water by a condenser 3 after working to rotate a turbine 2. The condensed water is transferred to a condensed water filter 4 and a condensed water demineralizer 5 by a condensed water pump 7. When the condensed water passes through the filter 4 and the demineralizer 5, iron cruds and impurity metal ions are removed thereby from the condensed water. The condensed water is fed to a reactor 1 by a feed water pump 8 through a feed water heater 6 which is arranged in several stages and heats the condensed water. A part of reactor water in the reactor 1 is recirculated by a recirculation pump 11 through a reactor water recirculation line. A further part of the reactor water recirculating through the reactor water recirculation line is recirculated into the reactor through a reactor water purification apparatus 9 by a CUW (reactor water clean-up system) pump 10. A line 21 is for recirculation of feed water and constitutes a feed water recirculation line through the condenser 3, the filter 4, the demineralizer 5, and the feed water heater 6.

In the above-mentioned primary cooling water recirculation system, a beryllium injection apparatus 12 is provided, at a downstream side of the condensed water demineralizer 5, for injecting beryllium into the cooling water on the downstream side of the demineralizer 5.

Stainless steel, Ni-base alloy, carbon steel, Cr-Mr steel etc. are used for various pipings, apparatus and devices in the power plant.

The injected beryllium is in a form of beryllium ion or beryllioum compound solution. In case of injection of beryllium, beryllium compound and beryllium alloy, in a solid form, it is preferable to make them powder and inject the powder.

As mentioned above, the beryllium is injected into the primary cooling water, whereby nickel and cobalt react with the iron crud to be converted to nickel ferrite and cobalt ferrite. As shown in FIG. 3, the beryllium is injected at the upstream side of the feed water heater 6, so that the beryllium promotes formation of a spinel structure film on the surfaces of the feed water pipes contacting the cooling water. When the film is formed on the feed water pipe surfaces, dissolution of nickel into the cooling water is supressed and the film has an effect to reduce $Co^{58}$.

Figure 4:
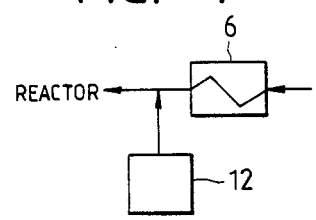
FIGS. 4 to 7 each are a schematic diagram of a part of the primary cooling water recirculation line showing an arrangement of a beryllium injection apparatus of an embodiment of the present invention.
Figure 5:
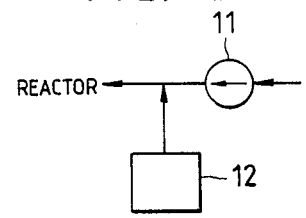
Figure 6:
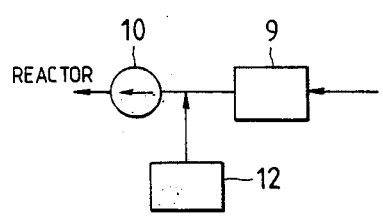

The beryllium injection apparatus 12 can be installed downstream of the feed water heater 6 as shown in FIG. 4, downstream of the recirculation pump 11 of the reactor water recirculation line, as shown in FIG. 5 or upstream of the recirculation pump 11. Further, the beryllium injector 12 can be disposed upstream or downstream of the CUW pump 10 at the downstream side of the reactor water puritification apparatus 9 of the reactor water recirculation line, as shown in FIG. 6. The beryllium injection apparatus further can be installed at any other position in the primary cooling water recirculation system in which the cooling water flows into the reactor. The beryllium injection apparatus can be installed in a similar position in a power plant in which part of cooling water by-passes the condensed water purification apparatus.

Figure 7:
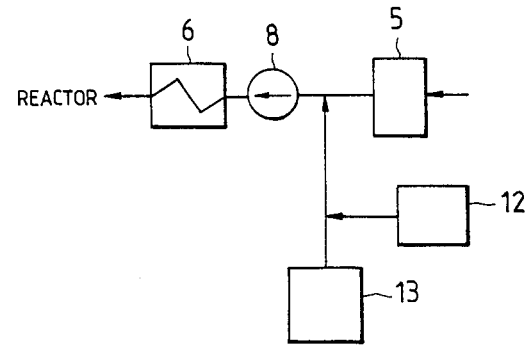

In a nuclear power plant provided with an iron injector 13, iron component is injected by the iron injector 13 so that the iron component will be two times as much as the molar quantity of nickel and cobalt, and the beryllium is injected at the same time by the beryllim injection apparatus 12. In this case, one of the injection positions is between the condensed water demineralizer 5 and the feed water heater 6 as shown in FIG. 7. Other injection positions can be at the same positions as the positions of the beryllium injector 12, as shown in FIGS. 4 to 6.

An example of a nuclear power plant provided with a contacting apparatus for contacting beryllium with a primary cooling water will be explained hereunder.

Figure 8:
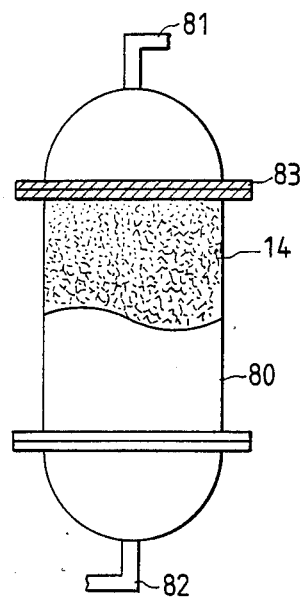
FIGS. 8 and 9 each are a sectional view of a beryllium injection apparatus of an embodiment of the present invention.
Figure 9:
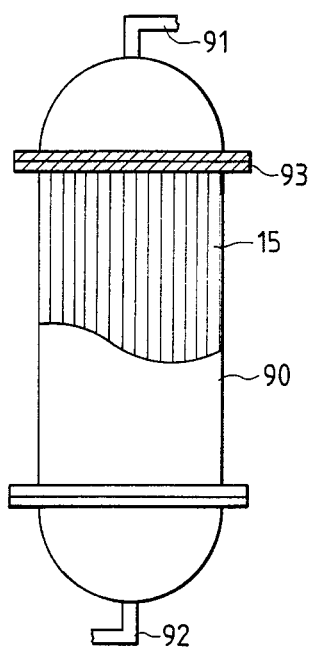

FIGS. 8 and 9 each show an example of the contacting apparatus.

In FIG. 8, the contacting apparatus comprises a container 80 with inlet 82 and outlet 81 for cooling water and particles 14 of beryllium such as beryllium element, beryllium compound and beryllium alloy, which are contained in the container 80. In FIG. 9, another contacting apparatus is shown which comprises a container 90 with inlet 92 and outlet 91 and a plurality of fine pipes 15 arranged in the container 90. The fine pipes 15 each have outer and inner surfaces including beryllium, and contact with a primary cooling water introduced into the container 90. The containers 80, 90 each have a flange construction 83, 93 for deviding, it into two parts thereof and joining the two part with help of screw means (not shown).

When at least a part of the primary cooling water passes through those contacting apparatus 80, 90, iron crud and nickel and/or cobalt contact with beryllium, whereby nickel and/or cobalt ferrite is produced in the cooling water. Further, beryllium dissolves in the cooling water by bringing the cooling water into contact with the beryllium. The dissolved beryllium is contained in the cooling water in a state of ion or compound and dispersed in the cooling water from the contacting apparatus to the reactor. The beryllium has a catalytic effect on the reaction between the iron crud and nickel and/or cobalt and promotes to produce nickel ferrite and/or cobalt ferrite.

The contacting apparatus for contacting the beryllium and the cooling water can be installed at any places of the cooling water recirculation line through which the cooling water flows into the reactor. Namely, the contacting apparatus can be arranged in any positions of the condensed water feed water line to the reactor, the reactor recirculation system an dthe reactor water purification system, and brings about the catalytic effect. In particular, when the contacting apparatus is arranged between the downstream side of the condensed water demineralizer of the condensed water feed water recirculation line and the reactor, between the downstream side of the reactor water purification apparatus in the reactor purification line and the reactor, and in the reactor water recirculation line, the beryllium carries out effectively the catalystic effect.

When the beryllium is injected into the cooling water, by providing a detector 22, as shown in FIG. 3, for detecting radioactivity intensity of Fe, Ni or Co nuclide and monitoring the intensity, the beryllium can be injected according to the monitored conditions.

The radioactivity intensity of the reactor water in the reactor or of the primary cooling water immediately before entering the reactor after injection of Be ion can be monitored.

EXAMPLE 3

An example, in which surfaces of structural members of a nuclear power plant which are in contact with a primary cooling water contain beryllium, will be explained hereunder.

Beryllium is caused to contain in surfaces of condensed water pipings, feed water pipings, feed water heater pipings, reactor recirculation pipings, reactor purification pipings or reactor inside structural members such as fuel rod claddings, the surfaces being in partial or full contact with the cooling water. One of methods of causing the structural member surfaces to contain beryllium is to contruct the above-mentioned structural members of beryllium-containing alloy. Another method is to cover the above-mentioned members, which are made of stainless steel, carbon steel, zircaloy or inconell, with a substance including beryllium.

As mentioned above, when the surfaces of the structural members contacting with the primary cooling water contain beryllium, iron crud and nickel and/or cobalt contained in the cooling water contact with the beryllium containing surface and produce nickel ferrite and/or cobalt ferrite under the catalytic function of the beryllium. Further the beryllium dissolves from the contact surface and is dispersed in the primary cooling water in a state of its ion or compound. The dissolved beryllium brings about a catalystic effect on the reaction between the iron crud and nickel and/or cobalt, thereby to promote to form nickel ferrite and/or cobalt ferrite.

In particular, in case the beryllium is caused to contain in the contacting surface of fuel cladding, iron crud and nickel and/or cobalt are concentrated and adhered to the contacting surface of the cladding at the surface of which boiling takes place, through evaporation thereat, so that the catalytic effect thereof is great.

EXAMPLE 4

In a present BWR power plant, a part of steam generated in the reactor 1 is used as a heat source of the feed water heater 6 and the condensed water is returned to the condenser 3.

Figure 10:
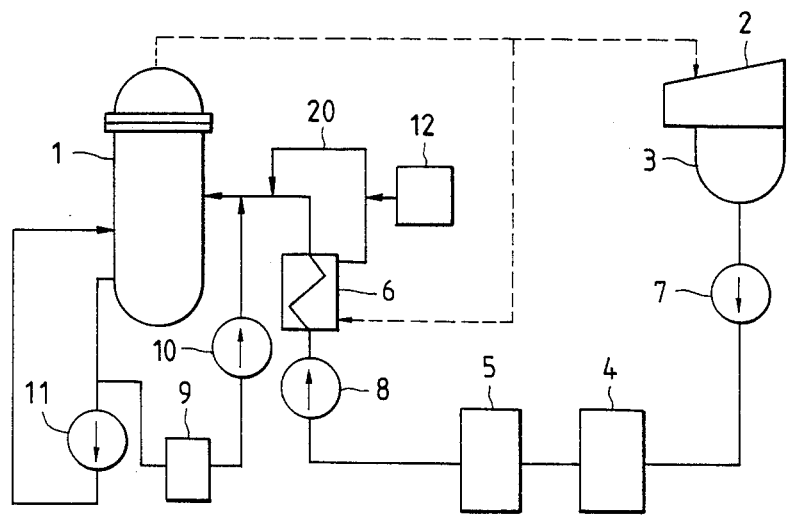
FIG. 10 is a schematic diagram of an ABWR power plant to which the present invention is applied.

In a new ABWR power plant, in order to raise the thermal efficiency, a construction that heater drain water 20 is directly returned to the feed water heater 6 is taken as shown in FIG. 10. In this case, the beryllium injection apparatus is arranged to inject beryllium component into the heater drain water 20, or contact surface portions of the pipings which are in contact with the heater drain water 20 are made of material including beryllium, whereby the above-mentioned catalytic effect can be caused.

EXAMPLE 5

Figure 11:
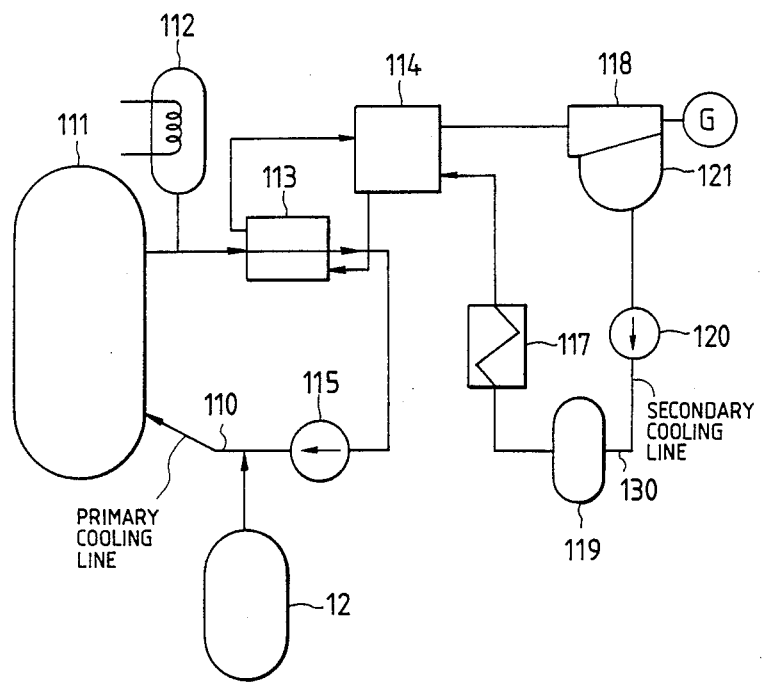
FIG. 11 is a schematic diagram of a PWR power plant to which the present invention is applied.

In FIG. 11 showing a PWR power plant, a primary cooling line 110 includes a reactor 111, a pressurerizer 112, a steam generator 113, and a primary cooling water pump 115 and a primary cooling water circulates therethrough. A secondary cooling line 130 includes a turbine 118, a condenser 121, a condensed water pump 120, a condensed water demineralizer 119, a feed water heater 117, a steam drum 114, and the steam generator 113, and a secondary cooling water is recirculated therethrough. In this example, the above-mentioned beryllium injection apparatus 12 is provided in the primary cooling line 110 between the reactor 111 and the downstream side of the steam generator 113, whereby iron crud and nickel and/or cobalt are converted to nickel ferrite and/or coblat ferrite in existance of beryllium and the radioactivity can be reduced as previously mentioned.

Further, by constructing the structural member of Be-containing alloy in stead of provision of the Be injection apparatus 12, the above-mentioned radioactivity can be reduced.

What is claimed is:

1. A method of reducing radioactivity of a nuclear power plant, comprising the steps of: introducing ions or fine particles of a catalytic substance having a catalytic effect on a reaction between iron crud and nickel and/or cobalt to form nickel ferrite and/or cobalt ferrite into a primary cooling water in a primary cooling water recirculation line of the nuclear power plant from outside of the recirculation line, heating and recirculating the primary cooling water in the primary cooling water recirculation line, and converting an iron crud and nickel and/or cobalt contained in and being in contact with the primary cooling water into nickel ferrite and/or cobalt ferrite through a catalytic reaction therebetween.

2. A method according to claim 1, wherein said catalytic substance is beryllium.

3. A method of reducing radioactivity of a nuclear power plant, comprising the steps of injecting beryllium into a primary cooling water in a primary cooling water recirculation line from outside of the recirculation line, heating and recirculating the primary cooling water in the primary cooling water recirculation line, and forming a film made of nickel ferrite and/or cobalt ferrite on each surface of piping of the primary cooling water recirculation line and structural members disposed in the primary cooling water recirculation line.

4. A method according to claim 3, wherein the step of heating and recirculating is effected before the power plant is heated through nuclear reaction, thereby to form said film.

5. A method of reducing radioactivity in a nuclear power plant, comprising the steps of injecting water containing beryllium ion and/or beryllium compound particles into a primary cooling water in a feed water recirculation line, heating and recirculating the primary cooling water in said feed water recirculation line through various apparatus and devices of a feed water heater, a condensor, a filter and a demineralizer at a time of periodic examination and forming a film comprising nickel ferrite and/or cobalt ferrite on each surface of piping of the feed water recirculation line and said various apparatus and devices, in contact with the primary cooling water.

6. A method of reducing radioactivity in a nuclear power plant, comprising the steps of injecting iron ion and one of beryllium and beryllium ion into a primary cooling water in a primary cooling water recirculation line of the power plant, heating and recirculating the primary cooling water, and forming a film including 95% or more of nickel ferrite and/or cobalt ferrite on each surface of piping of the primary cooling water recirculation line and structural members disposed in said primary cooling water recirculation line in contact with the primary cooling water.

7. A method of reducing radioactivity of a nuclear power plant, comprising the steps of injecting metal or metal ion having a catalytic function into a primary cooling water in a primary cooling water recirculation line, heating and recirculating the primary cooling water in the primary cooling water recirculation line, whereby at least 95% of an iron crud, nickel oxides and cobalt oxides formed on each surface of piping of the primary cooling water recirculation line and structural members disposed in the primary cooling water recirculation line is converted into nickel ferrite and cobalt ferrite to form a film of nickel ferrite and cobalt ferrite on said each surface of said pipings and said structural members.

* * * * *